(12) United States Patent
Seki

(10) Patent No.: US 7,304,234 B2
(45) Date of Patent: Dec. 4, 2007

(54) COVERING SHEET AND METHOD OF BENDING LINEAR MEMBER WITH THE SAME

(75) Inventor: Yoshinobu Seki, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/582,482

(22) Filed: Oct. 18, 2006

(65) Prior Publication Data

US 2007/0089893 A1    Apr. 26, 2007

(30) Foreign Application Priority Data

Oct. 20, 2005    (JP)    ............................ P2005-305649

(51) Int. Cl.
*H01B 7/34*    (2006.01)
(52) U.S. Cl. ........................................................ 174/36
(58) Field of Classification Search ................. 174/36, 174/DIG. 8; 428/36.1, 36.3, 100, 192, 193; 57/210, 243; 139/383 R, 404, 408, 409
See application file for complete search history.

(56) References Cited

U.S. PATENT DOCUMENTS 4,790,624 A * 12/1988 Van Hoye et al. .......... 385/118
6,034,329 A * 3/2000 Kawamura .............. 174/102 R
6,078,009 A * 6/2000 Kawamura .............. 174/102 R
6,822,166 B2 * 11/2004 James et al. ................... 174/93
6,948,241 B2 * 9/2005 Tadokoro ...................... 29/872
7,045,709 B2 * 5/2006 Koike et al. ................. 174/480

FOREIGN PATENT DOCUMENTS

| JP | 11-089057 A | | 3/1999 |
|---|---|---|---|
| JP | 2003-259528 | * | 9/2003 |
| JP | 2003-259528 A | | 9/2003 |
| JP | 2004-058431 A | | 2/2004 |

\* cited by examiner

*Primary Examiner*—William H. Mayo, III
(74) *Attorney, Agent, or Firm*—Sughrue Mion, PLLC

(57) ABSTRACT

A covering sheet for being wound around a linear member includes a flat surface portion. A plurality of easily expandable/contractible portions are formed on the flat surface portion, and are arranged along an extending direction of an axis of the linear member.

6 Claims, 6 Drawing Sheets

COVERING SHEET AND METHOD OF BENDING LINEAR MEMBER WITH THE SAME

BACKGROUND OF THE INVENTION

This invention relates to a covering sheet and a method of bending a linear member with the same which are suitably applied to a wire bundle of a wire harness for a vehicle.

FIG. 9 is a perspective view showing a procedure of covering a bundle of wires with a related covering sheet, and FIG. 10 is a view showing a condition in which the wire bundle, covered with the related covering sheet, is bent.

In the production of a wire harness, the wire bundle 3 is covered with the covering sheet 1 for the purpose of protecting and electrically insulating the wire bundle 3. In this related technique, the flat covering sheet 1 of a rectangular shape is wound around the wire bundle 3, and one end portion 1a of the covering sheet 1 is bonded to the other end portion 1b thereof spaced from the one end portion 1a in a widthwise direction (i.e., a Y direction) of the covering sheet 1 (see, for example, JP-A-2003-259528, JP-A-2004-58431 and JP-A-11-89057).

However, when the wire bundle 3 thus covered with the covering sheet 1 is bent into an arcuate shape with both hands according to a scheme of installing this wire bundle in a vehicle or the like, stresses concentrate on a generally lengthwise-central portion of the wire bundle 3, so that the wire bundle 3 is sharply bent at this localized portion (i.e., the central portion) thereof. This installation scheme for the vehicle or the like is carried out while the wire bundle 3 is kept in an arcuately curved condition, and therefore when the wire bundle 3 is sharply bent at the localized portion thereof, the wire bundle 3 projects beyond the installation range intended by the scheme, so that the wire bundle 3 interferes with or is caught by other part, and invites other troubles. And besides, in the case where the wire harness 2 is installed at a region where this wire harness 2 can be viewed, the wire harness looks poor. Such circumstances are encountered not only with the wire bundle 3 but also with other linear members (or wire-like members) such as a single wire, a pipe and a hose, and therefore are the problems common to these linear members.

SUMMARY OF THE INVENTION

It is an object of this invention to provide a covering sheet and a linear member-bending method which are capable of solving the above problems.

In order to achieve the above object, according to the present invention, there is provided a covering sheet for being wound around a linear member, comprising:

a flat surface portion, wherein a plurality of easily expandable/contractible portions are formed on the flat surface portion, and are arranged along an extending direction of an axis of the linear member.

Preferably, the easily expandable/contractible portions are arranged over an entire area of the flat surface portion.

Preferably, the easily expandable/contractible portions are arranged in a staggered manner.

Preferably, the easily expandable/contractible portions are concave/convex portions, each of which has a round cup-shape.

According to the present invention, there is also provided a linear member-bending method, comprising:

providing a linear member;

providing a covering sheet having a flat surface portion, a plurality of easily expandable/contractible portions being formed on the flat surface portion, and being arranged along an extending direction of an axis of the linear member;

winding the covering sheet around the linear member so that concave/convex portions, on which the easily expandable/contractible portions are formed, are disposed at an inner peripheral portion and an outer peripheral portion of a bent portion of the covering sheet; and bending the linear member at the inner peripheral portion and the outer peripheral portion of the bent portion.

Preferably, in the winding process, the concave/convex portions formed at one end portion of the covering sheet in a width direction of the covering sheet are fitted respectively to the concave/convex portions formed at the other end portion of the covering sheet spaced in the width direction of the covering sheet.

In the present invention, when the linear member is covered with the covering sheet, and then is bent, the inner peripheral portion of the bent portion of the covering sheet is compressed, so that wrinkles are formed uniformly at this inner peripheral portion. At the same time, the outer peripheral portion of the bent portion of the covering sheet is tensioned, and is expanded or stretched uniformly. As a result, the linear member is curved into an arcuate shape with a generally constant curvature over the entire length thereof, and therefore the linear member is prevented from being sharply bent at a localized portion thereof.

Therefore, troubles due to the sharp bending at the localized portion of the linear member, such as the interference thereof with other part and the catching thereof by other part, can be prevented. And besides, in the case where the linear member is installed at a region where the linear member can be viewed, the linear member looks good.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

A Preferred embodiment of the present invention will now be described with reference to the drawings.

Figure 1:
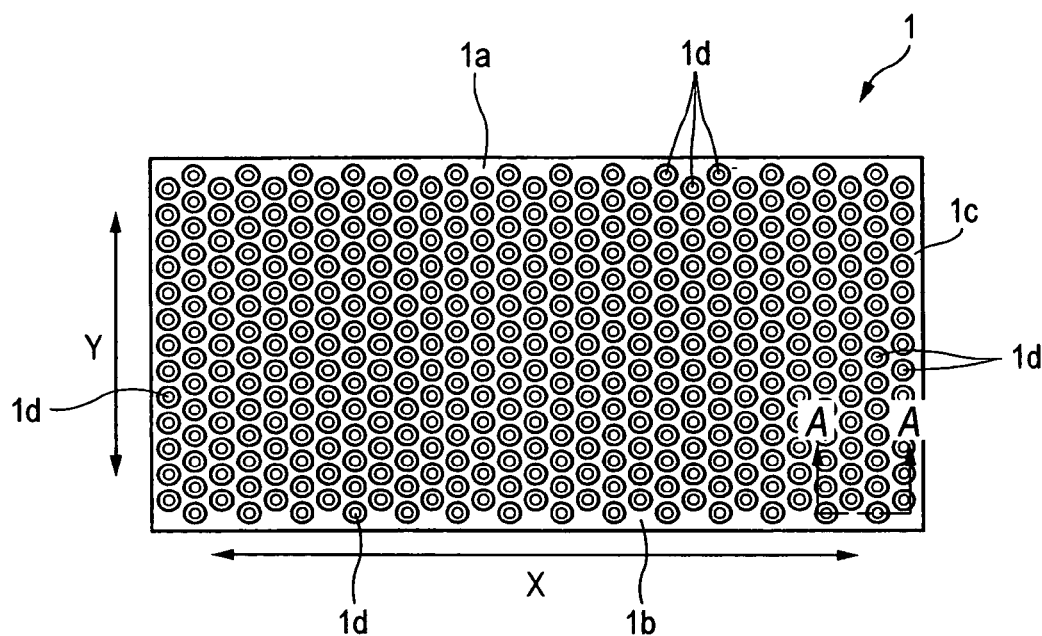
FIG. 1 is a plan view showing one preferred embodiment of a covering sheet of the present invention.
Figure 2:
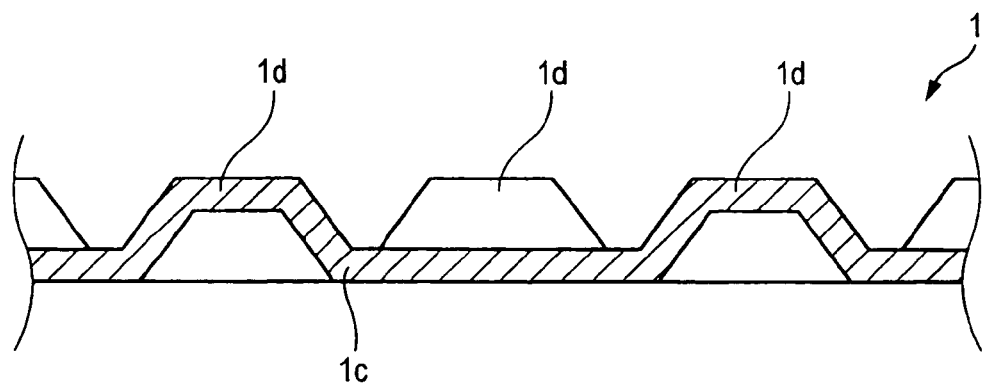
FIG. 2 is an enlarged cross-sectional view of the covering sheet taken along the line A-A of FIG. 1.
Figure 3:
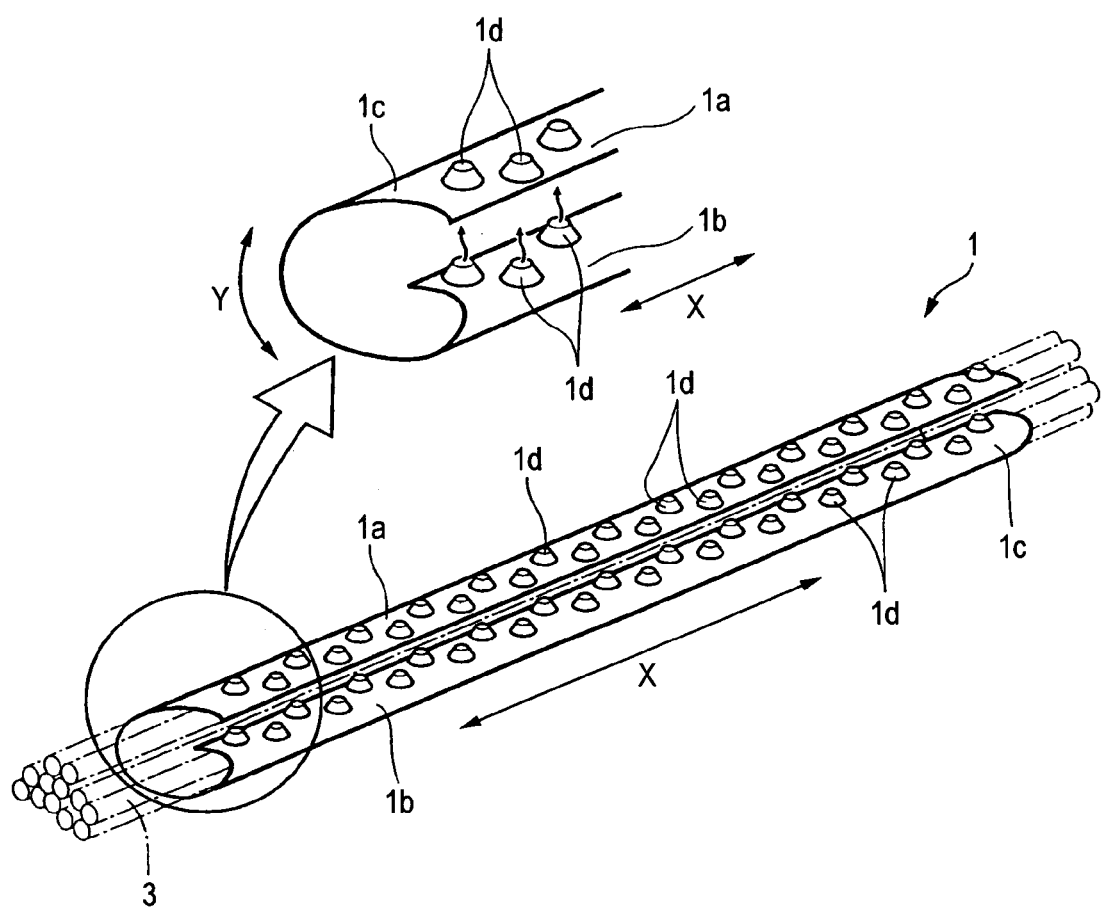
FIG. 3 is a perspective view showing a method of covering a wire bundle with the covering sheet of FIG. 1.
Figure 4:
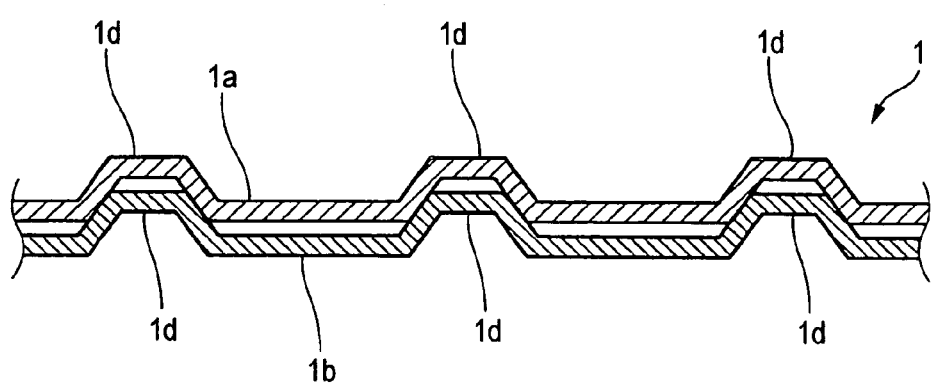
FIG. 4 is a cross-sectional view showing a fitted condition of concave/convex portions of the covering sheet of FIG. 3.
Figure 5:
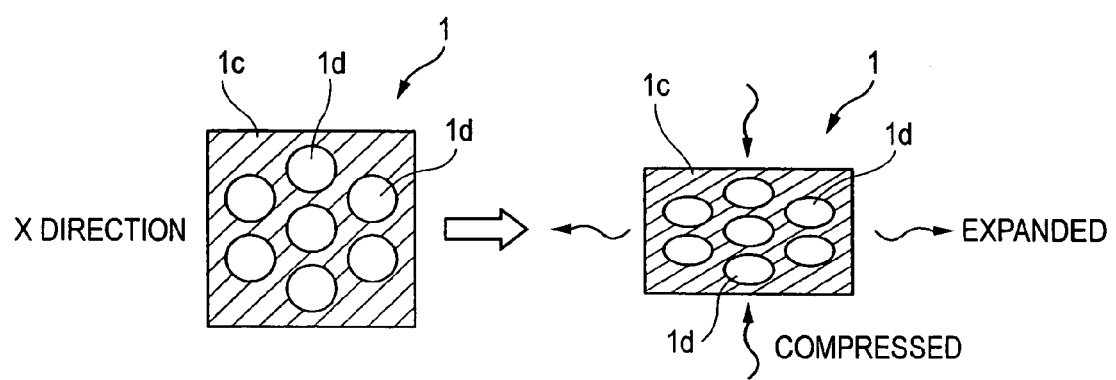
FIG. 5 is a schematic view showing the behavior of the covering sheet of FIG. 3 in an X direction.
Figure 6:
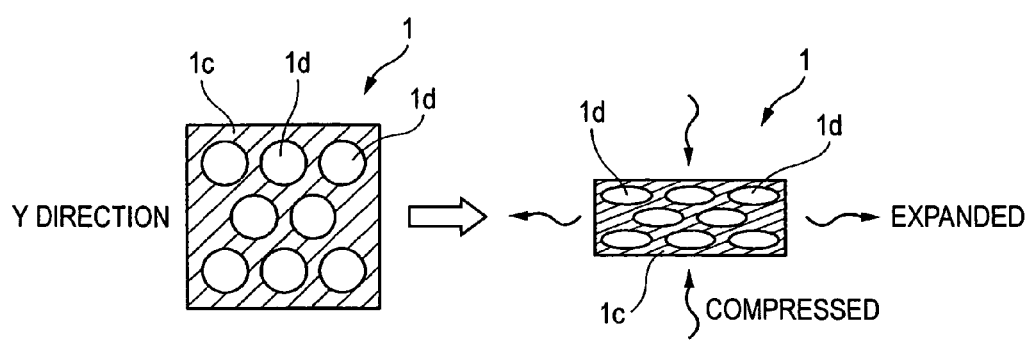
FIG. 6 is a schematic view showing the behavior of the covering sheet of FIG. 3 in a Y direction.
Figure 7:
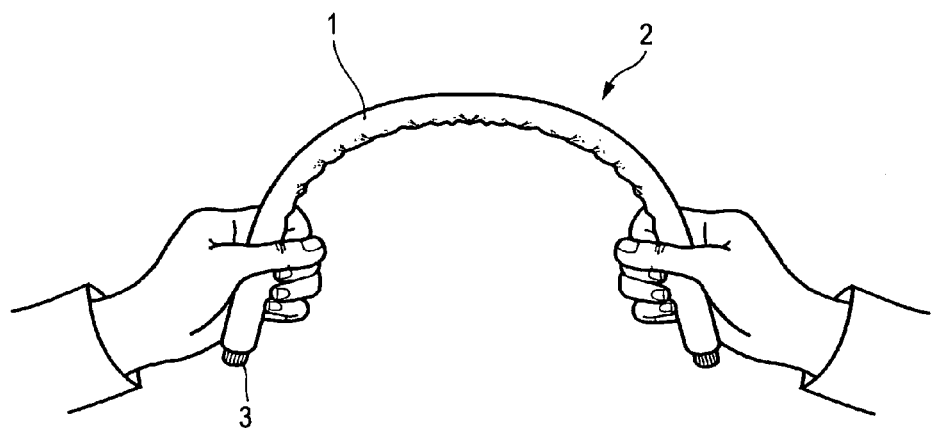
FIG. 7 is a view showing a condition in which the wire bundle, covered with the covering sheet of FIG. 1, is bent.
Figure 8:
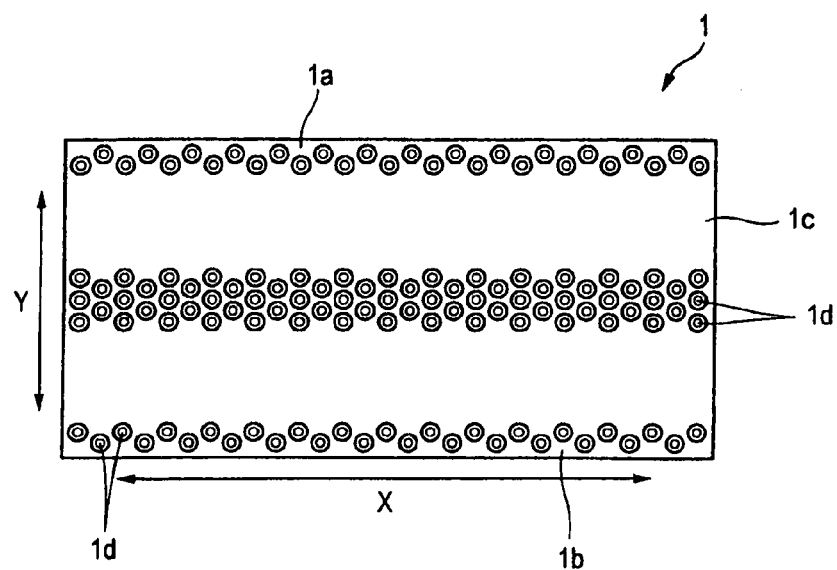
FIG. 8 is plan view showing another embodiment of a covering sheet of the invention.
Figure 9:
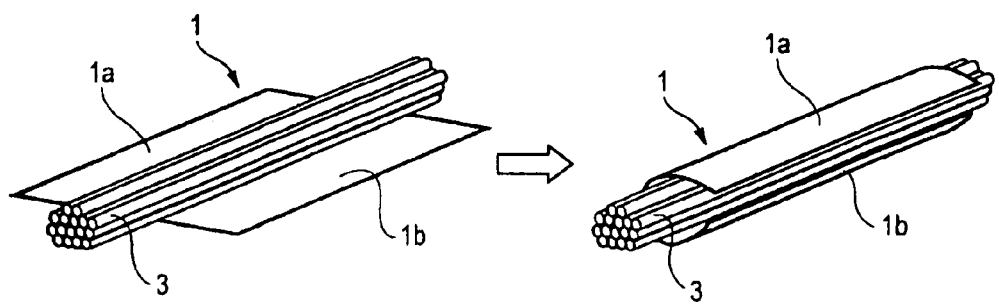
FIG. 9 is a perspective view showing a procedure of covering a wire bundle with a related covering sheet.
Figure 10:
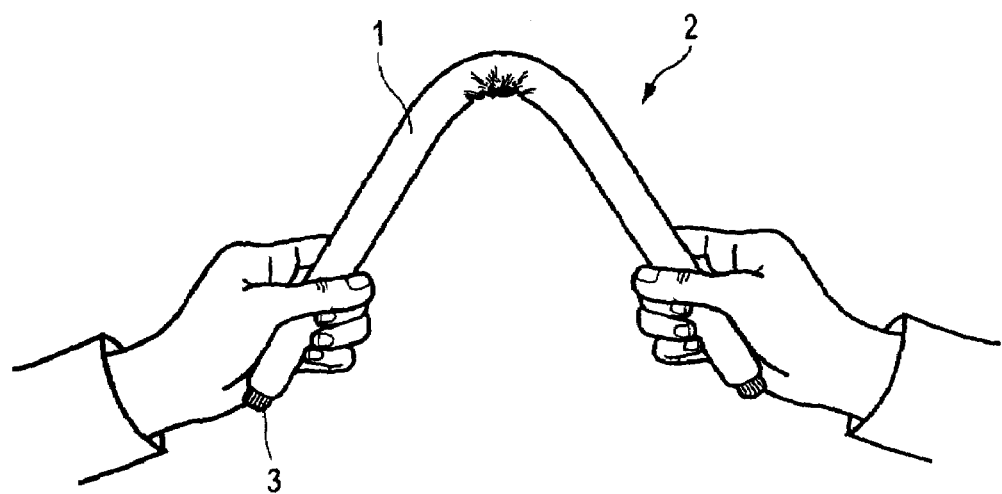
FIG. 10 is a view showing a condition in which the wire bundle covered with the related covering sheet is bent.

FIG. 1 is a plan view showing one preferred embodiment of a covering sheet of the invention, FIG. 2 is an enlarged cross-sectional view of the covering sheet taken along the line A-A of FIG. 1, FIG. 3 is a perspective view showing a method of covering a wire bundle with the covering sheet of FIG. 1, FIG. 4 is a cross-sectional view showing a fitted condition of concave/convex portions of the covering sheet of FIG. 3, FIG. 5 is a schematic view showing the behavior of the covering sheet of FIG. 3 in an X direction, FIG. 6 is a schematic view showing the behavior of the covering sheet of FIG. 3 in a Y direction, FIG. 7 is a view showing a condition in which the wire bundle, covered with the covering sheet of FIG. 1, is bent, and FIG. 8 is plan view showing another embodiment of a covering sheet of the invention.

The covering sheet 1 is molded of a synthetic resin having excellent electrical insulating properties, and this covering sheet 1 includes a flat surface portion 1c as shown in FIGS. 1 and 2. A large number of concave/convex portions (easily expandable/contractible portions) 1d each having a round cup-shape are formed at the flat surface portion 1c, and are distributed over an entire area thereof, and are arranged in a staggered manner. Namely, these concave/convex portions 1d are arranged or juxtaposed in a plurality of rows both in the X direction (a direction of an axis of the wire bundle 3 described later) and the Y direction (perpendicular to the X direction) of the covering sheet 1. The concave/convex portions 1d of any two adjacent rows extending in the X direction are alternately arranged in the X direction in such a manner that the two adjacent rows are offset from each other in the Y direction by one half of the pitch of the concave/convex portions 1d, each row of concave/convex portions 1d extending in the X direction being spaced at equal intervals. Each row of concave/convex portions 1d extending in the Y direction are arranged on a common line at equal intervals.

The covering sheet 1 has the above construction, and a procedure of covering the wire bundle 3 of a wire harness 2 with this covering sheet 1 will be described below.

First, in a sheet winding step, the covering sheet 1 is wound around the wire bundle 3 as shown in FIG. 3. At this time, the X direction of the covering sheet 1 is disposed parallel to the axis of the wire bundle 3.

Then, the process proceeds to a wire bending step. First, opposite end portions 1a and 1b of the covering sheet 1, spaced from each other in the Y direction (i.e., in the direction of the width of the covering sheet 1), are joined together. This joining operation is carried out by fitting the concave/convex portions 1d at the one end portion 1a respectively to the concave/convex portions 1d at the other end portion 1b. Thus, the concave/convex portions 1d of the one end portion 1a are fitted respectively to the concave/convex portions 1d of the other end portion 1b as shown in FIG. 4, so that the opposite end portions 1a and 1b of the covering sheet 1, spaced from each other in the Y direction, are joined together.

By thus fitting the concave/convex portions 1d of the opposite end portions 1a and 1b of the covering sheet 1 to each other, the covering sheet 1 is prevented from being displaced. And besides, each of the concave/convex portions 1d has the round cup-shape, and therefore the operation for fitting the concave/convex portions 1d can be rapidly and easily carried out.

Here, the operation for covering the wire bundle 3 with the covering sheet 1 is finished.

When the wire bundle 3 thus covered with the covering sheet 1 is bent with both hands according to a scheme of installing the wire harness 2 in a vehicle or the like, an inner peripheral portion of a bent portion of the covering sheet 1 is compressed. However, the concave/convex portions 1d are provided at this inner peripheral portion of the bent portion, and are juxtaposed in the X direction of the covering sheet 1 (that is, in the direction of the axis of the wire bundle 3), and therefore wrinkles are formed uniformly at this inner peripheral portion. On the other hand, an outer peripheral portion of the bent portion of the covering sheet 1 is tensioned. However, the concave/convex portions 1d are provided at this outer peripheral portion of the bent portion, and are juxtaposed in the X direction of the covering sheet 1 (that is, in the direction of the axis of the wire bundle 3), and therefore this outer peripheral portion is expanded or stretched uniformly. And besides, the covering sheet 1 has the concave/convex portions 1d arranged in a staggered manner, and therefore the flat surface portion 1c is deformed to assume a mesh-like configuration as shown in FIGS. 5 and 6, and therefore in addition to the expansion of the material itself, the expansion due to the deformation of the shape is applied to the bent portion, so that the bent portion is much expanded or stretched.

As a result, the wire bundle 3 is curved into an arcuate shape with a generally constant curvature over the entire length thereof as shown in FIG. 7, and therefore the wire bundle 3 is prevented from being sharply bent at a localized portion thereof.

Therefore, troubles due to the sharp bending at the localized portion of the wire bundle 3, such as the interference thereof with other part and the catching thereof by other part, can be prevented. And besides, in the case where the wire harness 2 is installed at a region where the wire harness 2 can be viewed, the wire harness 2 looks good.

Furthermore, the concave/convex portions 1d are formed at the flat surface portion 1c of the covering sheet 1 over the entire area thereof, and therefore even when the wire bundle 3 is bent in any direction, the concave/convex portions 1d always exist at the inner and outer peripheral portions of the bent portion of the covering sheet 1. Therefore, the direction of bending of the wire bundle 3 cover with the covering sheet 1 is not limited to any specified direction, and therefore this wire harness is very easy to use.

In the above embodiment, although the plurality of concave/convex portions 1d are provided in a staggered manner at the covering sheet 1, the concave/convex portions 1d do not always need to be arranged in a staggered manner in so far as these concave/convex portions 1d are juxtaposed in the X direction (that is, the direction of the axis of the wire bundle 3).

In the above embodiment, although the concave/convex portions 1d are formed at the flat surface portion 1c of the covering sheet 1 over the entire area thereof, the concave/convex portions 1d do not always need to be provided at the flat surface portion 1c over the entire area thereof. For example, as shown in FIG. 8, convex/concave portions 1d can be formed only at a central portion and opposite end portions 1a and 1b of the covering sheet 1 which are spaced from one anther in the Y direction, in which case the wire bundle is bent in such a manner that the convex/concave portions 1d are disposed at the inner and outer peripheral portions of the bent portion of the covering sheet 1.

In the above embodiment, when covering the wire bundle 3 with the covering sheet 1, the opposite end portions 1a and 1b of the covering sheet 1, spaced from each other in the Y direction, are joined together, using the concave/convex portions 1d disposed at the opposite end portions 1a and 1b. However, any other suitable fixing unit than the concave/ convex portions 1*d*, such for example as a planar fastener or an adhesive can be used in so far as such fixing unit can join the opposite end portions 1*a* and 1*b* together in a manner to prevent the opposite end portions 1*a* and 1*b* from being displaced relative to each other.

In the above embodiment, although each of the easily expandable/contractible portions 1*d* is defined by the round cup-shaped concave/convex portion 1*d*, each easily expandable/contractible portion 1*d* can be defined by a concave/convex portion have any other suitable shape such for example as a square cup-shape having four rounded apex portions or a T-shaped cup-shape.

In the above embodiment, although the wire bundle 3 of the wire harness 2 is covered with the covering sheet 1, the invention can be applied to the case where any other suitable linear member than the wire bundle 3, such for example as a single wire, a pipe or a hose, is covered with the covering sheet.

This invention can be extensively applied to various fields of industries such as the automobile, airplane, electric train, manufacturing plant, electrical appliances and OA equipment industries, in which linear members such as wire bundles are used as parts.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-305649 filed on Oct. 20, 2005, the contents of which are incorporated herein for reference.

What is claimed is:

1. A covering sheet for being wound around a linear member, comprising:

a flat surface portion, wherein a plurality of cup-shaped portions are formed on the flat surface portion, and are arranged in a matrix so as to extend in a longitudinal direction of the linear member and in a transverse direction perpendicular to the longitudinal direction.

2. The covering sheet according to claim 1, wherein the cup-shaped portions are arranged over an entire area of the flat surface portion.

3. The covering sheet according to claim 1, wherein the cup-shaped portions are arranged in a staggered manner.

4. The covering sheet according to claim 1, wherein the cup-shaped portions have a round shape.

5. A method of bending a linear member with a covering sheet, comprising:

providing a linear member;

providing a covering sheet having a flat surface portion, a plurality of cup-shaped portions being formed on the flat surface portion, and being arranged in a matrix so as to extend in a longitudinal direction of the linear member and in a transverse direction perpendicular to the longitudinal direction;

winding the covering sheet around the linear member so that cup-shaped portions are formed are disposed at an inner peripheral portion and an outer peripheral portion of a bent portion of the covering sheet; and bending the linear member at the inner peripheral portion and the outer peripheral portion of the bent portion.

6. The method according to claim 5, wherein in the winding process, the cup-shaped portions formed at one end portion of the covering sheet in a width direction of the covering sheet are fitted respectively to the cup-shaped portions formed at the other end portion of the covering sheet spaced in the width direction of the covering sheet.

\* \* \* \* \*